United States Patent [19]

Mitchell

[11] 4,374,546
[45] Feb. 22, 1983

[54] CONDITIONING APPARATUS FOR DIRT RACE TRACKS

[75] Inventor: Charles E. Mitchell, West Delaware, Ohio

[73] Assignee: Larcom & Mitchell Company, Inc., Delaware, Ohio

[21] Appl. No.: 165,377

[22] Filed: Jul. 2, 1980

[51] Int. Cl.³ .............................................. A01B 5/00
[52] U.S. Cl. ................................. 172/148; 172/150; 172/413; 172/415; 172/737; 172/519
[58] Field of Search ................... 172/140, 147–149, 172/150, 152, 155, 166, 173, 175, 177, 179, 182, 187, 193, 199–201, 314, 391, 413, 418, 441, 440, 451, 519, 552, 583, 587, 594–596, 599, 618, 640, 657, 693, 695, 696, 661, 662, 687–689, 747, 713, 762, 763; 280/490 A, 490 R

[56] References Cited

U.S. PATENT DOCUMENTS

| 154,792 | 9/1874 | Friedeman | 172/688 |
|---|---|---|---|
| 235,431 | 12/1880 | Harter | 172/134 |
| 277,029 | 5/1883 | Harter | 172/150 |
| 293,520 | 2/1884 | Rumble | 172/689 |
| 393,392 | 11/1888 | Reed | 172/418 |
| 594,892 | 12/1897 | Newton | 172/148 |
| 623,645 | 4/1899 | Young | 172/713 |
| 786,170 | 5/1905 | Stanley | 172/423 |
| 1,572,004 | 2/1926 | Gaskill | 172/198 |
| 2,082,283 | 6/1937 | Godfrey | 172/713 |
| 2,160,964 | 6/1939 | Godfrey | 172/713 |
| 2,513,165 | 6/1950 | Gilreath | 172/177 |
| 2,537,802 | 1/1951 | Thomas | 172/175 |
| 2,546,531 | 3/1951 | Vutz | 280/490 R |
| 2,840,971 | 7/1958 | Grecson | 172/466 |
| 2,997,115 | 8/1961 | Moser | 172/199 |

FOREIGN PATENT DOCUMENTS

286373 5/1971 U.S.S.R. ............................ 172/413

Primary Examiner—Richard J. Apley
Assistant Examiner—Carl Moy
Attorney, Agent, or Firm—Robert E. Stebens

[57] ABSTRACT

A conditioning apparatus is provided for working of an upper surface layer of a dirt race track to form a cushion of loosened and uncompacted earth particles. The apparatus includes a rigid structural frame mounted on a single elongated supporting roller extending substantially the entire width of the apparatus. A plurality of transversely extending beams are fixedly secured to the frame and each carries a plurality of vertically extending earth working tines. The frame is vertically adjustable on the roller to a selected elevation and a leveling mechanism is interconnected between the frame and a towing bar to enable pivoting of the frame about the single roller to a horizontal plane when the towing bar is connected to a towing vehicle.

12 Claims, 10 Drawing Figures

CONDITIONING APPARATUS FOR DIRT RACE TRACKS

BACKGROUND OF THE INVENTION

This invention is directed to an earth working apparatus designed specifically for conditioning of dirt tracks for use in horse racing. Such race tracks require periodic surface conditioning to form a loose and uncompacted surface layer for protection of the hoofs of the horses and improve the racing. As a consequence of track use and environmental weather conditions, earth tracks will frequently have the soil particles compacted into a solid mass that is damaging to the hoofs of horses and does not provide a suitable track surface that produces adequate traction for either optimun performance or safety.

When an earthen track has its surface severely compacted, it forms an extremely hard and substantially smooth surface that becomes exceptionally slippery with respect to a horses' hoofs which are provided with iron shoes. During the course of utilization of such tracks, the compacting of the soil is compounded by the weight of the horses and pounding of the hoofs in effecting further compaction of that soil. Such a hard compacted surface results in injury to the horses through the increased shock forces occasioned as a consequence of running and this eventually results in physical injury and damage which may be of a prolonged and often permanent nature to the hoof structure, bones, muscles, and cartlidges so as to prematurely render a horse physically unfit for further racing. Additionally, a hard, compacted track surface provides little in the way of traction and the horses' hoofs will readily slip and thereby detract from their race performance. Furthermore, the hard smooth surface condition may enhance the likelihood of injury in that the horses may slip and fall.

Different types of races require different depths of soil conditioning. For some races, it is desired that the soil have a very shallow conditioned surface layer, such as being of the order of one-half inch. Other race conditions require that the surface be conditioned to a depth of two to three inches. It is also desired that the track surface be level and have a uniformly prepared surface so as to provide a standard track condition for all horses in a given race. This uniform condition as to degree of compaction or depth of the relatively uncompacted surface layer is difficult to achieve and maintain as each race tends to cause shifting of the track surface to an extent that high and low areas are developed around the track as well as continually compacting the track surface. This unevenness may be more predominant in certain areas, such as on turns, but it nevertheless occurs throughout the complete extent of the track.

Various types of apparatus have heretofore been utilized in the conditioning and preparing of dirt tracks for horse races. One common type of apparatus employs a rigid frame structure on which are mounted a large number of rod-like tines or teeth. This apparatus, with those teeth vertically oriented, is pulled over the track surface with the objective of the teeth being to penetrate in the upper surface layer of the track and dig into the earth so as to loosen it and form a top surface layer of relatively loose and uncompacted particles. While the known prior apparatus provided with tines is capable of performing this general function of loosening the earth, the prior apparatus has not been found to be capable of forming a carefully controlled surface layer.

It is known that attempts have been made to construct machines that were specifically designed to perform the track conditioning function. One such machine comprised a rigid structural frame mounted on wheeled supports in fixed relationship so that the frame was carried at a fixed elevation with respect to the track surface. A plurality of earth working tines were provided and were mounted on several support beams carried by the structural frame. These beams were mounted on the frame for selective positioning in a vertical direction to obtain a desired tine penetration depth in the track surface with each beam being independently adjustable. While being capable of performing an earth working function so as to condition a track surface, such prior machines have not been found completely satisfactory. One major problem is the difficulty encountered in attempting to alter the depth of penetration of the tines into the underlying track surface. It is a time consuming task to separately adjust the vertical position of each beam on the frame and, with such independent adjustment, it is extremely difficult to obtain the desired uniformity of working depth. Another significant problem with the prior machines is their relative inability to achieve sufficient structural strength through adjustable mounting of the tine support beams on a frame to enable the machine to withstand the forces usually encountered in conditioning of race tracks.

SUMMARY OF THE INVENTION

A track conditioner is provided by this invention and embodies a construction that enables the apparatus to effectively condition a top layer of soil to an accurately controlled depth and to also effect surface leveling. The apparatus incorporates a rigid frame carrying a number of vertically oriented, soil penetrating tines with these tines being positioned in particular predetermined positions relative to each other for effective and complete working of the soil surface across the entire width of the machine. Control of depth of working is effected by a roller type support which is carried by the frame. The roller is effective in not only controlling the depth of working but also enables the apparatus to be effective in leveling the level track surface. The rigid frame and roller combination enables the apparatus to work down any high spots in the track and move the earth associated with the high spots to the relatively lower areas.

The rigid frame structure is provided with a plurality of transversely extending beams on which the tines are mounted. The tines are positioned on respective ones of the beams in relatively spaced relationship with the positioning and relative dimension of the tines being such that the number of rows or beams carrying such tines will result in a tine contacting or being drawn through the entire extent of track that underlies the apparatus.

The roller support for the frame is relatively adjustable in a vertical direction with respect to the apparatus frame and enables selective adjustment to obtain a desired working depth. To further enhance the ability of the apparatus to effectively perform its operation of leveling, this roller comprises a series of hard rubber surfaced wheels that are mounted on a common axle. The roller is disposed at a mid-point of the apparatus with the same number of transversely extending, tine-supporting beams in front as there are at the rear of the roller. This elongated roller support is effective in assuring the apparatus will be working off from the high spots of the track surface and will not permit the machine to oscillate laterally as is the case with prior apparatus and thus merely follow the former track surface.

Additional control in obtaining the leveling condition is obtained by an adjustment mechanism innerconnected between the structural frame and a tongue assembly which is used to innerconnect the apparatus with a towing vehicle such as a tractor. This mechanism is innerconnected and operable to permit a relative angular displacement of a tow bar of the tongue assembly in a vertical plane and thus enable the apparatus to be precisely adjusted with respect to the towing vehicle connection and the operating depth of the apparatus. With this mechanism it is possible to maintain the apparatus framework in the desired parallel relationship to the track surface regardless of the type of towing vehicle that is utilized or the depth of working that is being employed.

Vertical adjustment of the roller and frame is achieved by a hydraulic mechanism which is powered by the towing vehicle. This hydraulic depth adjustment includes respective hydraulic operated cylinder and piston units that are mechanically interconnected with respective axle support mechanisms at each end of the roller and secured to the frame. These units are preferably operated in unison. Additionally, the hydraulic mechanisms are provided with selectable mechanical limits so that the apparatus may be operated to always obtain the same working depth for a selected condition. During the course of operation of such an apparatus, it is frequently necessary that the frame be relatively elevated to remove the tines from the track surface for transport and re-positioning of the apparatus. Consequently, when the frame is again lowered to its working depth, it is essential that the frame be accurately lowered to the same position with respect to the supporting roller. This is accomplished by the selected mechanical limit stop.

The tines, in the preferred embodiment of the apparatus, are formed from hardened square steel rods. These rods have a tooth-structure formed on their lower ends which comprises cutting of the square shaped tines across a diagonal for a specified length and then facing that diagonal surface with that carbide tip. The tines are thus mounted with that carbide surface facing in the direction of travel and the square shanks of these tines enables them to be maintained in this desired fixed position. Because of the extremely hard packed earth conditions that are encountered, as well as the occasional rocks that may be found in such tracks, a backup or tine support plate is provided at each of the tine locations. This backup plate is rigidly secured to the bottom of the tine supporting beam and has a width that is less than the diagonal dimension of the square bar tines. A leading edge extending vertically of the plate is provided with a V-shaped notch which interengages with the tine and further enhances the ability of the apparatus to maintain the tine in the properly oriented position as well as adding strength to resist bending of the tine. Preferably, the vertical extent of this backup plate is slightly less than that of the tooth which extends or projects below the beam. Since the operating depth of the apparatus will, as a maximum, be of the order of three inches, the tines are mounted and of a length so as to project approximately three inches below the bottom surface of the respective support beams. The backup plates are designed to have a vertical extent of one-half inch less and thus only the lowermost end of each tine will be unsupported by this auxiliary plate.

Since race tracks are composed of various types of soils running from the more light, sandy type to the relatively heavier, clay-type, different roller constructions can be advantageously utilized. For example, a rubber surfaced roller can be used with the sandy soils whereas a steel bar roller can be better used with the clay-type soils. A steel bar roller is advantageous for clay soils in that it will not readily retain lumps of clay as may happen with a rubber roller. The clay soils tend to adhere to the surface of a rubber surfaced roller and would also tend to adhere to any continuous surface roller. However, a continuous surface roller is advantageous in that it may be utilized in an earth compacting function which is useful for packing of a track in the event rain is anticipated so as to result in better run-off and decreased tendency to absorb water.

These and other objects and advantages of this invention will be readily apparent from the following detailed description of an illustrative embodiment thereof. Reference will be had to the accompanying drawings which illustrate this embodiment.

DETAILED DESCRIPTION OF THE ILLUSTRATIVE EMBODIMENT

Figure 1:
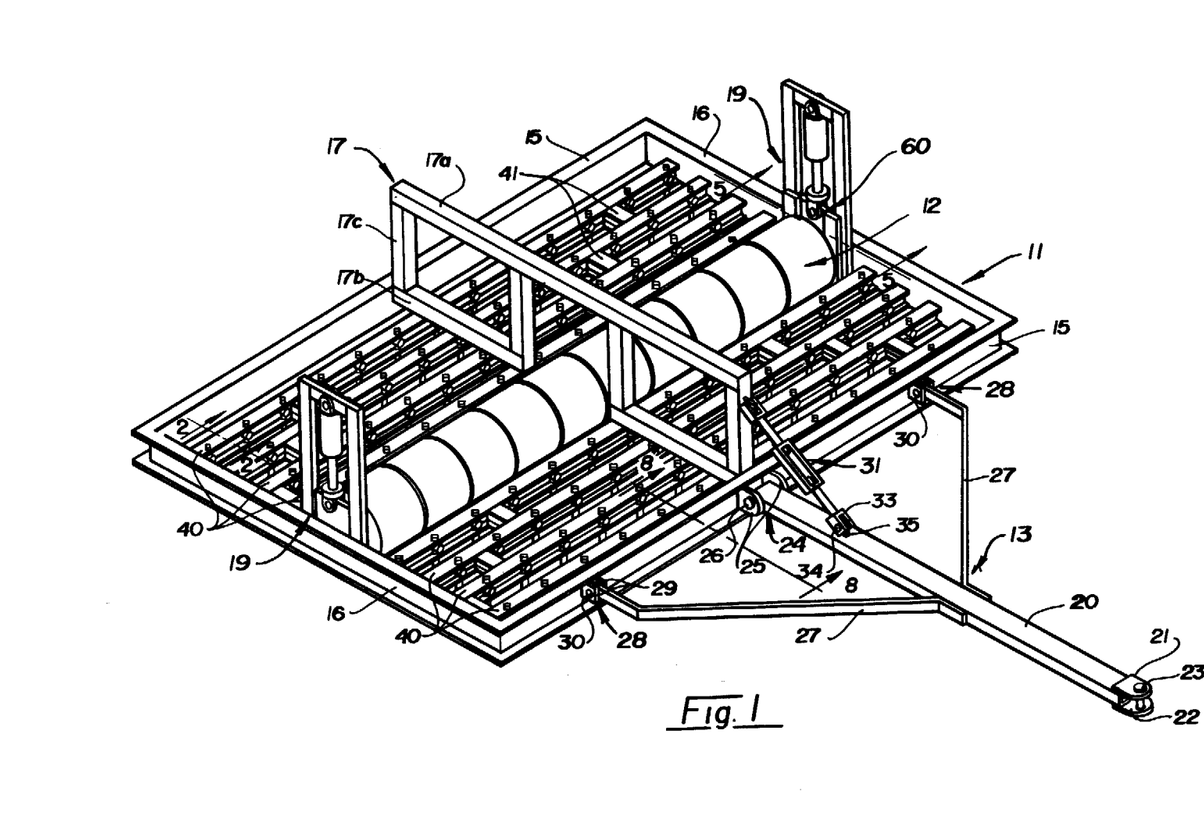
FIG. 1 is a perspective view of a surface conditioning machine for a race track embodying this invention.

A track conditioning machine designated generally by the numeral 10 embodying this invention is shown in the perspective view of FIG. 1 and is seen to be of a type which is designed to be towed by a vehicle such as a tractor which is not shown. In general, the conditioning machine 10 comprises a rigid structural frame 11, wheeled support means 12 on which the frame is mounted and a tongue or tow bar assembly 13 which also functions in maintaining the frame in a horizontal plane. Carried by the structural frame 11 are a plurality of upstanding tines 14 which are caused to penetrate the upper surface layer of a dirt track and effect conditioning of that upper surface layer of the race track to a predetermined depth. The illustrative embodiment of the machine 10 is of a size having a nominal frame dimension of ten foot in width and seven and one-half feet in length. This size of machine has been found particularly desirable for a large number of race tracks although machines of larger width have also been constructed such as twelve foot for relatively wider tracks. It will be understood that the width of the machine is dependent on the track size and the desirability of completeing a conditioning and leveling operation in a lesser amount of time.

Forming the structural frame 11 are pairs of transversely extending and longitudinally extending channel-shaped beams that form the front and rear beams 15 and the two side beams 16 of the basic frame structure. Each of these beams 15 and 16 has a channel size of the order of six inches and they are securely interconnected at their adjoining corner innersections such as by welding to form a rigid, rectangularly shaped frame. To facilitate attachment of the wheel support means 12 and the mounting of the tines 14, these channels are oriented with their flanges facing outwardly thus presentng a flat planar surface at the interior side of the frame.

Enhancement of structural rigidity of the frame is obtained through the provision of an intermediate longitudinal beam 17. This beam 17 is positioned approximately at mid-point between the longitudinal side beams 16 and has its forward and rear ends rigidly secured to the front and rear transverse beams 15. This intermediate longitudinal beam 17 is constructed with an open section at its longitudinal midpoint to form a bypass and clearance space for the wheel support means 12. A box beam of 2¼" size is advantageously utilized to form the intermediate longitudinal beam 17 and includes an upper beam 17a that extends the full length of the machine and a pair of underlying partial length beams 17b. These partial length beams 17b are secured at one end of each to the front and rear transverse beams 15 and terminate centrally of the basic frame in relatively spaced relationship to define a space for the wheel support means 12. Four vertical struts 17c formed from the same type of box beam are also included in the structure and are secured at their upper and lower ends to the upper and lower beams 17a and 17b.

Providing support of the machine and for use in aiding the machine to perform its functional operations is the wheel support means 12. This wheel support means include an elongated roller 18 which is positioned in transversely extending relationship to the frame at its approximate longitudinal point. Respective roller mounting structures 19 are provided at each end of the roller and secured to the respective longitudinal side beam 16 for securing of the roller to the frame. Each mounting structure 19 embodies a structural design which permits selective vertical adjustment of the frame 11 with respect to the roller, thereby facilitating selective adjustment in the depth of penetration of the earth working tines 14 relative to the surface of a race track.

Attachment of the machine to a towing vehicle is effected through the tow bar assembly 13. As previously indicated, the two bar assembly also functions to enable the structural frame 11 to be adjusted to and leveled with respect to the track surface, that is, maintained in a horizontal plane during operation. The tow bar assebly 13 includes an elongated primary connecting bar 20 formed from a square tube and which projects longitudinally forward from the front transverse beam 15 and provides the primary towing connection. At its forward end, the connecting bar 20 is provided with a draw bar coupling 21 for connecting with a towing vehicle. This coupling 21 is of a simple structure is a conventional type utilized for such purposes and includes a pair of spaced plates 22 having an aligned aperture through which a draw bar pin 23 may be inserted. The opposite end of the connecting bar 20 is pivotally connected to the transverse front beam 15 by a hinge assembly 24. This hinge assembly 24 includes a pair of transversely spaced, vertically oriented plates 25 that are welded to the forwardly facing web of channel 15 and project a distance forwardly of that front surface. A hinge pin 26 extends horizontally through aligned apertures formed in the hinge plates 25 and through an aligned aperture formed in a terminal end of the tubular connecting bar 20. Thus, it will be seen that the connecting bar 20 may be pivoted in a vertical plane about a horizontal axis.

Lateral rigidity of the connecting bar 20 is provided by a pair of angularly disposed braces 27. These braces 27 are formed from flat bars and have their forward ends welded to the side walls of the connecting bar 20. Each brace has its rearward end formed at an angle to be disposed in perpendicular relationship to the front surface of the transverse beam 15. Securing of each brace to the transverse beam is accomplished by respective hinge assemblies 28 that include pairs of spaced hinge plates 29. These hinge plates 29 are also welded to the front surface of the transverse beam 15 and are formed with the aligned apertures through which a hinge pin 30 projects and which also projects through an aperture formed in the terminal end of the respective brace 27. With this tow bar construction, it will be seen that the tow bar may be swung in a vertical plane for the leveling function but will be prevented by the braces from swinging in a horizontal plane relative to the frame, thus enabling the towing vehicle to cause turning of the machine.

Figure 8:
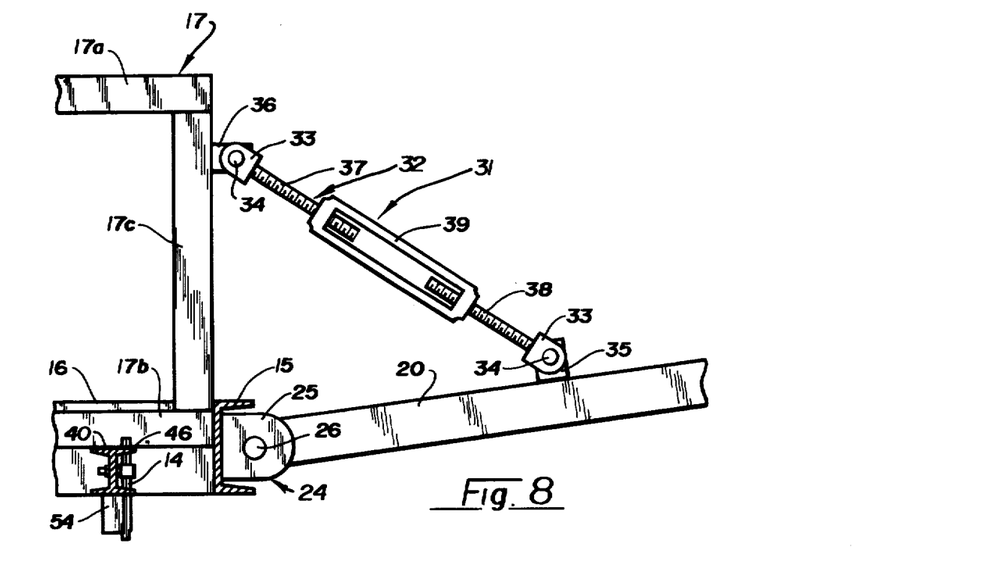
FIG. 8 is a fragmentary vertical sectional view taken along a plane passing through line 8—8 of FIG. 1 showing the frame leveling mechanism.

Leveling of the structural frame 11 with respect to the track surface is accomplished through a leveling means indicated generally at 31 and is shown in enlarged detail in FIG. 8. The leveling means 31 is a mechanical structure which can be mechanically adjusted to effect a change in the relative angular positioning of the connecting bar 20 in a vertical plane with respect to the horizontal plane of the structure frame. Included in the leveling means is an elongated tow bar support shaft 32 which is of a mechanical construction to be selectively adjustable as to its length. Opposite ends of the tow bar support shaft 32 are provided with respective hinge assembly brackets 33 which are of a relatively simple mechanical nature and include a pair of spaced parallel plates and a transversely extending hinge pin 34.

Secured to the connecting bar 20 and to the upper beam 17a of the longitudinal beam 17 are respective hinge connecting plates 35 and 36 with each plate being positioned to interfit between the spaced plates of the respective hinge assembly brackets 33 and being interconnected therewith by the respective hinge pins 34.

The tow bar support shaft 32 in this illustrative embodiment comprises two opposite threaded shafts 37 and 38 that are each secured at one end to a respective hinge assembly 33 and are interconnected to each other at their adjacent ends by a turn buckle 39. Relative rotation of the turnbuckle 39 will thus effect a change in the axial length of the support shaft 32 as a consequence of the opposite threading either to increase or decrease its length and result in a selective positioning of the connecting bar 20 in angled relationship to this structural frame 11. Specific functioning of the tow bar 13 will be further explained hereinafter with respect to the operation of the machine.

As previously indicated, conditioning of the earth constituting the surface layer of the race track is achieved through the plurality of upstanding tines 14. These tines are carried in a plurality of transversely extending rows by respective mounting beams 40. Eight such mounting beams 40 are provided in the illustrative embodiment of the machine with each beam being provided with fifteen tines. These beams are advantageously formed from structural I-beams to obtain the necessary strength to resist bending by the tines penetrating into the underlying track surface and being pulled therethrough. Each beam is of a dimensional size having a web height of three inches and each is vertically oriented with the opposed ends being rigidly secured to the inwardly facing surface of the longitudinal side beams 16. Additional rigidity and strength is imparted to the frame 11 and to the tine support beams 40 by a plurality of cross-blocks 41 extending longitudinally of the machine between the several tine mounting beams 40 and the respective front and rear transverse beams 15. These cross blocks are formed from I-beams of the same size as the tine beams and are welded thereto to form an extremely rigid structure. It will be noted that these blocks are not longitudinally aligned so as to accommodated the staggered arrangement of the tines to be further explained.

Formed in upper and lower forwardly projecting flanges 46 of each beam are a series of transversely spaced, square apertures through which respective ones of the tines 14 extend in supported relationship to the beam. Each of the tines 14 is formed from an elongated bar of square cross-section and the apertures are oriented to cause positioning of those square bars with a corner thereof projecting in a forward direction.

Figure 2:
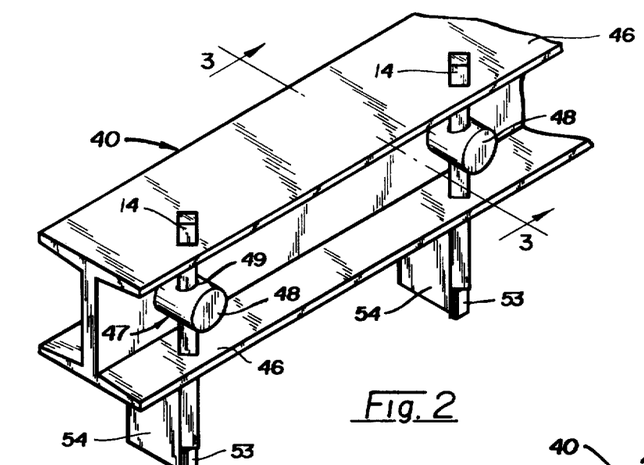
FIG. 2 is a fragmentary perspective view on an enlarged scale of one of the tine supporting bars taken along a vertical plane passing through line 2—2 of FIG. 1.
Figure 3:
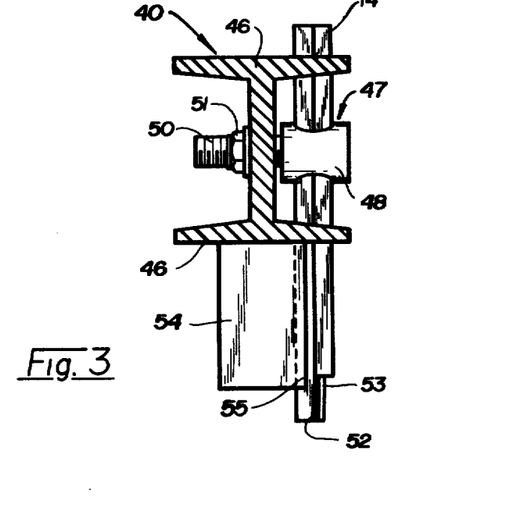
FIG. 3 is a vertical sectional view on a further enlarged scale taken along a plane passing through line 3—3 of FIG. 2.

Securing of each tine 14 in fixed relationship to its supporting mounting beam 40 is effected by a clamping device 47 that is best seen in FIGS. 2 and 3. Each clamping device 47 comprises a relatively short cylinder having a transverse circular aperture formed therein through which a respective tine projects. One end of each cylinder 48 is provided with an axially projecting, threaded shaft 50 which is adapted to extend through a mounting hole formed in the web of the mounting beam 40. A lock nut 51 is threaded onto the end portion of the threaded shaft 50 and is drawn up tightly against the opposite surface of the beam web to pull the clamping device 47 into secure frictional engagement with the tine 14 and to also tightly seal the tine in the aperture in the beam flange 46. Since the apertures formed in the flanges 46 of the beam are of the same configuration and size as the tine 14, they will prevent the tines from relatively rotating and the tines will be maintained in the desired illustrated position with a corner thereof facing forwardly.

Figure 4:
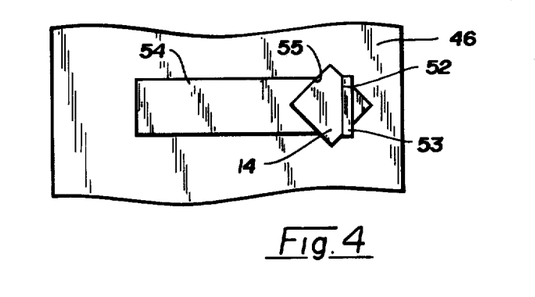
FIG. 4 is a bottom plan view on an enlarged scale of a transverse section of the tine supporting bar as seen in FIG. 3.

Each of the tines 14 is approximately six and one-half inches in length thus having about three inches of the tine projecting below the bottom surface of the lower flange 46 of the mounting beam with the top end substantially flush with the upper surface of the top flange. A terminal end portion of the lowermost part of each tine is cut as is best seen in FIGS. 2, 3 and 4 to remove approximately one-half of the bar resulting in a forwardly facing flat surface 52. This surface 52 is formed slightly forward of a transverse diagonal across the corners of the bar but the effective working face is essentially equal to the diagonal dimensions of the bar. Greater resistance to wearing abrasion of the tine is obtained through attachment of a carbide plate 53 to the diagonal surface 52.

Additional structural strength for each of the tines to aid in their resisting the substantial bending forces is provided by back-up plates 54 that are of a flat configuration having a thickness which is less than the diagonal width of the bars forming the tines. This dimensional relationship can be best seen in FIG. 4 wherein it will also be noted that a forward facing end edge of each plate is formed with a vertically extending V-shaped groove 55. Each of the plates 54 is secured to the bottom flange of the respective mounting beam 40 and extends in a downwardly projecting relationship. These plates are disposed in a longitudinally extending plane with respect to the frame and which plane is essentially aligned with a respective tine 14. The vertical height of the back-up plate 54 is slightly less than the length of of the tine projecting below the respective beam and is preferably one-half inch less in length. Thus, with the tine projecting approximately three inches below the bottom of the mounting flange 46, the back-up plates 54 will only project downwardly about two and one-half inches. Each plate 54 is advantageously positioned so that its forwardly facing V-shaped groove 55 will closely align with the apertures through which the tine extends in the flanges 46 and thus be in contacting engagement with the tine to provide a rigid support for the tine. This has been found to be of extreme importance in a machine of this type to enable it to better withstand the extremely high forces that are encountered in propelling the teeth through a relatively hard packed track surface and to better withstand impact with stones. It is also advantageous to temper the steel tines to increase their strength and ability to resist abrasive wear.

Figure 9:
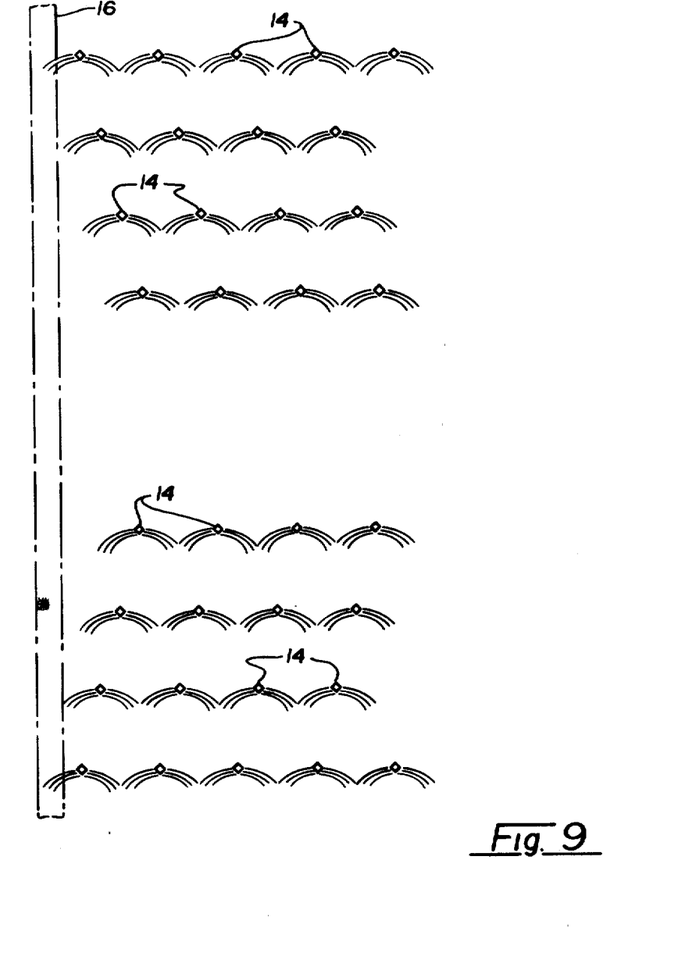
FIG. 9 is a diagrammatic plan view showing the relative positioning of the plurality of tines and their operational function.

Position of the tines 14 on the machine with respect to each other is of considerable importance in assuring that the machine will be optimally effective in performing its function of conditioning the upper surface layer of the race track. In this illustrative embodiment of the invention, it was found particularly advantageous to laterally space the fifteen tines in each row at eight inch intervals with four mounting beams positioned forward of the wheel support means 12 and four means positioned rearwardly. The preferred positioning or arrangement of the tines is best seen in FIG. 9 which diagrammatically illustrates the tines and their relative positioning to function and perform the desired soil conditioning operations. The tines, as between adjacent transverse rows, are spaced apart in staggered relationship a distance of two inches. Thus, with respect to the four front mounting beams 40, the first tine in each row is seen as positioned one, three, five and seven inches, respectively, inwardly with reference to the adjacent surface of a longitudinal side beam 16. All other tines on each respective row and mounting beam are spaced eight inches and thus the same staggered relationship is maintained with respect to the four mounting beams. As to the four rear tine mounting beams 40, the tines are oriented in an inverse staggered relationship with the dimensional spacing of the end most ones from a longitudinal side beam 16 being eight, six, four and two inches starting with the forwardmost beam. Thus, it will be seen that the tines of the trailing four beams are positioned in intermeshing relationship relative to the four rows of the front tines.

Figure 5:
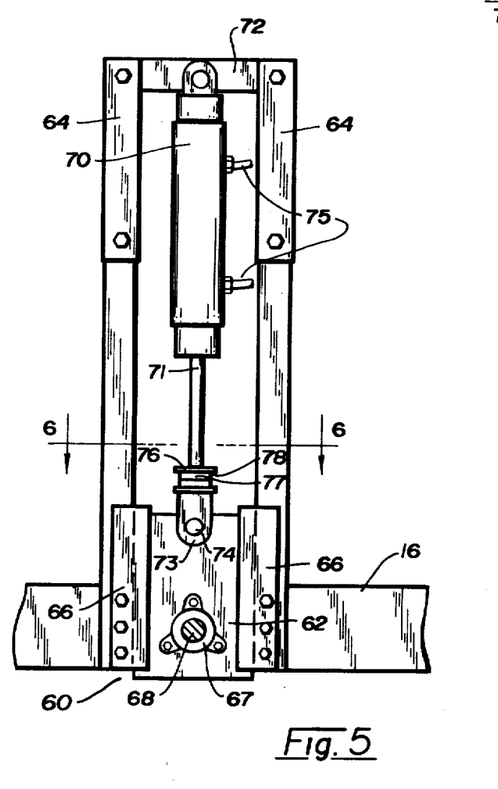
FIG. 5 is a fragmentary vertical sectional view on an enlarged scale taken along a plane passing through line 5—5 of FIG. 1 showing the hydraulic actuated, working depth controlling mechanism.
Figure 6:
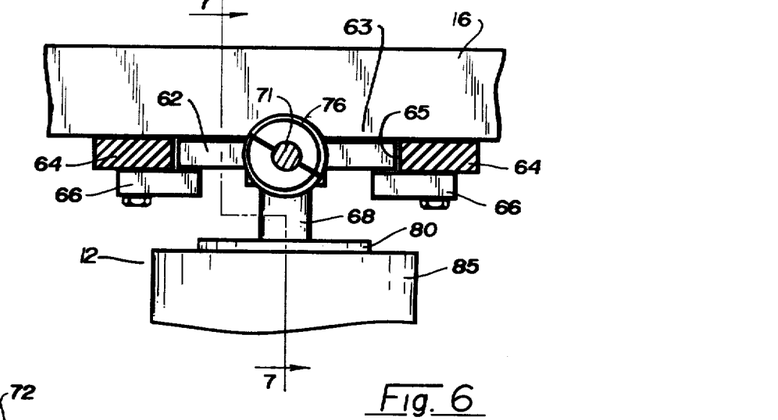
FIG. 6 is a horizontal sectional view taken along line 6—6 of FIG. 5.
Figure 7:
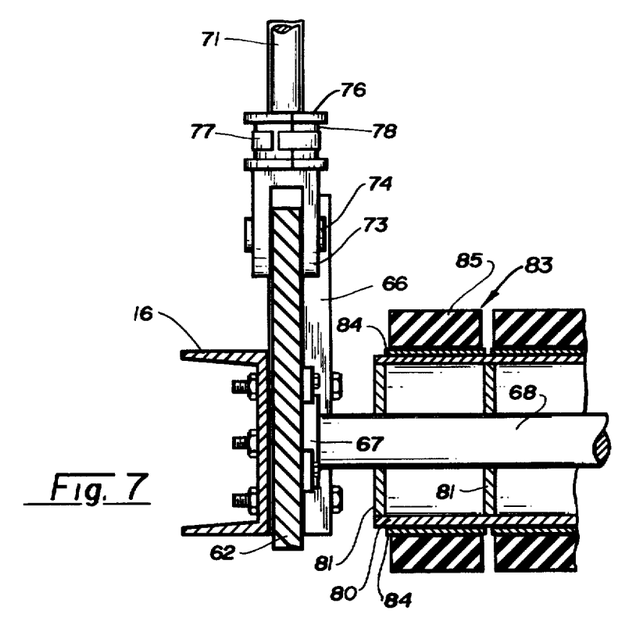
FIG. 7 is a vertical sectional view taken along line 7—7 of FIG. 6.

It will also be noted that since each of the tines is formed from a bar of one-half inch square cross section and that these tines are diagonally positioned with respect to the path of movement, it is the diagonal width that is effective as to the digging effect in the track surface. Consequently, the effective width of each tine is of the order of five-eighths inch and there will be an overlap in the space covered by each tine as between the tines in the front and rear groups of four tines in the basic configuration. This overlapping relationship is of particular effectively enable the tines in the front and rear transverse rows to work the underlying track surface across the entire width of the machine. While there is a small lateral space as between the longitudinally extended side edges of next adjacent tines, the tines are capable of working that space as a consequence of the tines laterally displacing the soil as the tine is pulled through soil. Depending upon the speed at which the machine is pulled, the soil will be displaced to a greater or lesser extent. Depth of penetration of the tines 14 is controlled by operation of the roller mounting structures 19 which are effective in raising or lowering the frame 11 with respect to the roller 18 so that the frame may be positioned at a selected height with respect to the track surface. Each roller mounting structure 19 includes a roller mounting assembly 60 and a vertical actuating assembly 61. These assemblies 60 and 61 are best seen in FIGS. 5, 6 and 7 which illustrates an exemplary structure. Included in the roller mounting assembly 60 is a roller plate 62 which is vertically oriented for vertical displacement in a guideway 63. The guideway 63 is formed by a pair of longitudinally spaced parallel, upright guide bars 64 having their lower end portions secured to an inner face of the respective side beam 16 in longitudinally spaced relationship. The spacing of the guide bars 64 is such that their opposed facing edges define guide surfaces 65 along which the opposed edges of the roller mounting plate 62 may slide in vertical reciprocating motion. Retention of the mounting plate 62 between the guide bars 64 is accomplished by a pair of retaining plates 66. These retaining plates 66 comprise flat plates that are secured to inwardly facing surfaces of respective guide bars 64 and are relatively positioned to project a distance toward each other and from the guide surface 65 so as to overlie a portion of the space between the guide bars. Thus, the retaining plates 66 in cooperation with the inner vertical surface of the side beam 16 define a socket through which the mounting plate 62 may be reciprocally moved. A bearing 67 is secured to each lower end portion of a roller mounting plate 62 and has an end portion of a roller axle 68 journalled therein.

Vertical displacement of the roller mounting plate 62 is affected by selective operation of the actuating assembly 61. The actuating assembly 61 in this illustrative embodiment is of a hydraulic fluid type comprising a cylinder 70 and its respective piston and piston rod 71. One end of the cylinder 70 is vertically suspended from a support bar 72 which in turn is carried in secured relationship to the uppermost ends of the guide bars 64. The downwardly projecting end of the piston rod 71 is secured to the roller mounting plate 62 by a U-shaped clevis 73 which is pivotally secured with the mounting plate. A pivot pin 74 extends the clevis 73 and mounting plate to rigidly secure the rod to the mounting plate. The cylinder 70 is of a double acting type and has appropriate fluid connections 75 provided at opposite ends thereof for interconnection into a fluid system. Although a single acting type could be used, the double acting is preferred as it provides a fluid-locked position in an operating mode of the machine thus preventing oscillation that could otherwise occur and result in variance in tine penetration depth. The fluid system itself is not illustrated as suitable systems as are utilized with agricultural equipment of this type are well known. Preferably, the system would include a driven hydraulic fluid pump carried by the towing vehicle and incorporating appropriate control valves to provide prepressurized fluid. Flexible fluid conduits would then be provided for interconnection of that pressurized fluid source with each of the cylinders 70.

Functioning of the roller mounting assembly 19 affects a relative change in the elevation of the frame 11 and the wheeled support means 12 to effect a change in the depth of penetration of the tines. Since during the course of operation of the machine it is frequently necessary to elevate the frame and completely withdraw the tines from the track surface as for transport of the machine to a different location, it becomes necessary to then be able to lower the frame into an operating position and to obtain the same desired depth of penetration by the tines. This can be conveniently accomplished with the illustrative mechanism by providing selected length spacing collars 76 that can be removably secured onto the piston rod 71. One such collar having a predetermined axial length is illustrated in FIGS. 5, 6 and 7 and is of a split collar type provided with a split retaining spring 77 that interfits in a central circumferential groove 78. Functioning of the actuating assembly is that the tines 14 are withdrawn from the track surface upon causing extension of the piston rod 71 from its cylinder 70. Retraction of the piston rod 71 results in lowering of the frame 11 and re-entry of the tines into the track surface. By positioning a spacing collar 76 of desired axial length on the piston rod, a precise predetermined depth of penetration can be repeatedly obtained. This results from the fact that the cylinder 70 will only relatively lower with respect to the clevis 73 to the extent permitted by that collar. By providing various sizes of collars as to their effective axial length, or a plurality of collars, it is possible for the operation to utilize a particular collar or combination and be assured of a constant positive depth of penetration during the course of operation. It will be noted that the maximum effective operating depth of the tines described herein is three inches; thus, a cylinder 70 having a stroke of four inches will be sufficient but a greater stroke length, such as eight inches, will provide greater ground clearance while the machine is being transported.

The wheel support means 12 which is shown in its substantially entirety in the perspective FIG. 1, has details of structure thereof better seen in FIGS. 6 and 7. This support means is formed from a series of separate wheel elements which are mounted on a common supporting axis. This supporting structure, or hub assembly, comprises an elongated cylinder 80 which has end plates 81 that are secured onto the elongated axle 68. A plurality of intermediate plates 82 may also be provided in axially spaced relationship on the axle 68 to increase the structural strength and rigidity of the roller hub and extend the expected operational life. Mounted upon the cylinder 80 are a plurality of rubber surfaced wheels 83 which are disposed in adjacent relationship to provide a substantially continuous surface. Each wheel 83 includes a central mounting ring 84 which is of a diameter to closely interfit on the exterior surface of the cylinder 80. Carried on each mounting ring 84 is a rubber wheel 85 which is of a solid construction. For illustrative purposes, these wheels 85 have an outside diameter of ten and one-half inches and are five inches wide. The central mounting ring 84 has an internal diameter of six and one-half inches.

A roller type wheel support means 12 is provided to better enable the conditioning machine to perform its function of leveling of the track surface as well as the conditioning operation. The roller, since it extends the entire width of the machine, will tend to support that machine on the highest points of the underlying track surface rather than merely follow a surface as would be the case of a machine supported only by two relatively narrow wheels. Thus, in cooperation with the lateral displacing effect of the tines 14, the machine will be enabled to displace earth toward track surface areas that are relatively lower and thus effect the leveling function. It will also be noted that the central location of the roller with respect to the structural frame 11 permits leveling of the frame relative to a horizontal plane or the track surface in combination with the tow bar 13. Since the machine may be utilized with a towing vehicle which has other than a particular draw bar height and also since adjustment of the relative elevation of the roller and frame to obtain a different tine working depth will cause a relative pivoting action, it is necessary to then realign the frame of the machine with respect to a horizontal plane. Since the tines 14 are all preferably mounted on their respective beams 40 to project a same distance downwardly from the bottom flange 46 with the bottom ends of all tines being in a same common plane parallel to the frame, it will be seen that realignment or leveling of the frame with respect to a horizontal plane will also result in the bottom ends of all tines being placed in a horizontal plane. This is accomplished by the tow bar support shaft 32. Rotation of the turn buckle 41 will cause a relative pivoting of the tow bar with respect to the frame. Appropriate turning of the turnbuckle 41 thus enables one to obtain the desired horizontal disposition of the frame.

Figure 10:
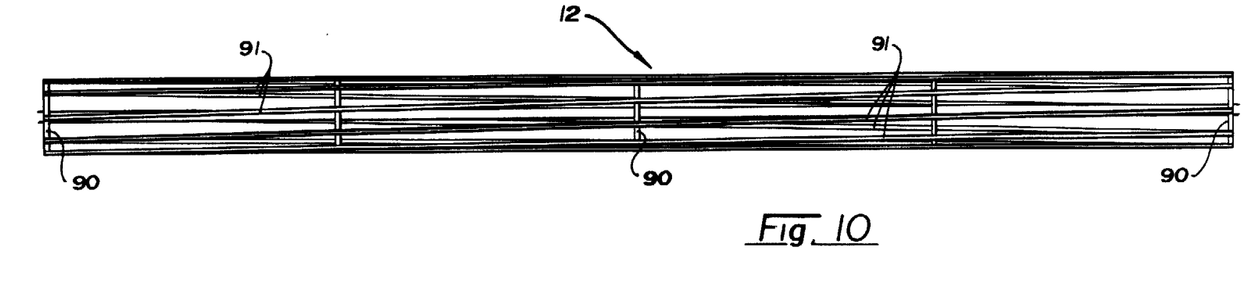
FIG. 10 is a fragmentary vertical elevational view of an alternative roller structure for the surface conditioning machine of this invention.

The previously described roller structure forming a wheel support means 12 for the machine operates well when utilized on light, sandy soils but the continuous roller surface tends to pick up clay soils that are damp or slightly wet. The clay coils tend to form a layer around the periphery of the roller and fill up the spaces between the rubber wheels 85. Consequently, with such track surfaces it is advantageous to utilize an open or bar type roller structure such as that which is shown in FIG. 10. This roller structure comprises a plurality of circular support plates 90 mounted on the axle 68 and a plurality of elongated round bars 91 secured to the plates and extending axially of the roller structure. The support plates 90 are secured to the axle in fixed axially spaced relationship and are provided with apertures or sockets in angularly spaced relationship around their outer peripheral edge portion for reception of the respective bars 91 therein. Each of the bars 91 may be rigidly secured in its respective sockets. Preferably, the bars 91 are helically disposed with a sufficient number of bars provided to effectively form a continuous roller surface for a smooth rolling action but having adequate open space between bars to prevent pick-up and accumulation of clay-type soils.

It will be readily apparent from the foregoing detailed description of an illustrative embodiment of the track conditioning machine, that an improved apparatus is provided for working of an upper surface layer of a dirt race track to obtain a loose cushion of predetermined depth. The mounting of the earth working tines in a relatively fixed position on a rigid frame results in an extremely strong structure that is capable of withstanding the forces encountered in working of dirt race tracks. Adjustability of the frame relative to the track surface by selective adjustment of a roller support on the frame provides for a convenient and accurate adjustment of the working depth of all tines. Secondary adjustment of the angular disposition of the frame and towing assembly provides a convenient means for placing the frame in a horizontal plane regardless of tine working depth or structural characteristics of the vehicle used for towing the machine. The tine configuration and relative positioning in combination with the roller support and adjustment enables the machine to also effect leveling of the track surface.

Having thus described this invention, what is claimed is:

1. A conditioning apparatus for dirt race tracks comprising a structural frame having a longitudinal axis disposed parallel to the path of movement of the apparatus and including a plurality of elongated tine supporting beams disposed in relatively spaced, transversely extending relationship to the direction of travel of the apparatus in traversing a track, an elongated towing bar extending in forwardly projecting relationship to said frame for coupling of the apparatus to a towing vehicle, said towing bar having one end thereof pivotably connected to said frame for swinging movement in a vertical plane about an axis transverse to the frame's longitudinal axis and the other end adapted to mechanically interconnect with a towing vehicle, wheeled support means mounted on said frame for support thereof in traversing movement over a track in predetermined spaced relationship above a surface of the track, said wheeled support means including an elongated roller disposed in transversely extending relationship to the longitudinal axis of said frame, said wheeled support means being pivotably mounted on said frame to permit relative pivoting of said frame about an axis parallel to said elongated roller, a roller mounting structure mechanically coupled between said wheeled support means and said frame and being selectively operable to adjust the vertical position of said frame relative to said wheeled support means, a plurality of upstanding, earth working tines mounted on said frame in a predetermined relative arrangement, each of said beams having a plurality of said earth working tines mounted thereon in relatively spaced relationship, said beams being subdivided into two groups each having a plurality of said beams, said first group being positioned forward of said roller and said second group being positioned rearward of said roller, said earth working tines disposed in laterally offset relationship to each other tine on each other beam with respect to said longitudinal axis and having a tine on each successive beam in a group offset a same predetermined distance with respect to a tine on the next preceding beam, the tines on each group of beams all being offset in a same direction, but in relatively opposite directions as between said first and second groups of beams, each of said tines having a bottom end disposed relative to said frame to project a distance below said frame to penetrate into an upper surface layer of the track to a predetermined depth whereby the penetrating tine portions will be pulled through the track's surface layer during traversing movement of the apparatus and thereby form a loose earth cushion surface on the track, and leveling means mechanically coupled between said frame and said towing bar for securing the towing bar in predetermined relationship to said frame to maintain said frame at a selected position relative to a horizontal plane when said towing bar is secured to a towing vehicle, said leveling means selectively operable to enable adjustment of the towing bar to a relative angular position with respect to said frame to position said frame at a desired selected position relative to a horizontal plane for any selected vertical spacing of said frame relative to a track surface.

2. A conditioning apparatus according to claim 1 wherein said earth working tines in each of said groups of said beams are laterally offset a distance of the order of twice the effective lateral width of a tine.

3. A conditioning apparatus according to claim 1 wherein each said beam includes a back-up plate rigidly secured thereto on a bottom of the respective beam in downwardly projecting relationship and in aligned relationship with the path of travel of each respective tine, each said back-up plate having a vertical edge disposed in supporting contacting engagement with a respective tine.

4. A conditioning apparatus according to claim 3 wherein each tine projects a greater distance downwardly than the respective one of said back-up plates.

5. A conditioning apparatus according to claim 1 wherein each tine supporting beam is secured in fixed relationship to said frame.

6. A conditioning apparatus according to claim 1 wherein said leveling means includes an elongated shaft interconnected at its opposite ends to respective ones of said frame and said towing bar, said shaft being selectively adjustable in its axial length to effect changing of the angular disposition of the towing bar relative to said frame.

7. A conditioning apparatus according to claim 6 wherein said leveling means includes a mounting post of predetermined length secured to one of said frame and said towing bar in upstanding relationship thereto, and said elongated shaft has one end thereof connected to said mounting post in remotely disposed relationship to the struts point of attachment to one of said frame and towing bar and has its other end connected to the other one of said frame and said towing bar which is not connected to said post.

8. A conditioning apparatus according to claim 1 wherein said roller mounting structure includes a pair of such structures which are disposed in transversely spaced relationship to mount opposite ends of said roller on said frame, each such roller mounting structure mechanically coupled between said elongated roller and said frame with each such roller mounting structures being selectively adjustable to enable adjustment of the vertical position of said frame relative to said roller.

9. A conditioning apparatus according to claim 8 wherein said frame includes a pair of spaced apart, longitudinally extending side beams with a roller mounting structure secured to each respective side beam to secure said roller to said frame at a longitudinal midpoint thereof.

10. A conditioning apparatus according to claim 9 wherein said side beams define the lateral extremities of the apparatus and said roller extends substantially the entire width thereof.

11. A conditioning apparatus according to claim 8 or 9 wherein each said roller mounting structure includes a guideway and a guide reciprocably movable in said guideway in a vertical direction with said guideway and guide being secured to respective ones of said frame and roller, and actuating means mechanically interconnected with said guideway and guide and selectively operable to affect relative displacement thereof.

12. A conditioning apparatus according to claim 11 wherein said actuating means comprises a fluid operated cylinder and piston.

* * * * *